United States Patent [19]

Valyocsik et al.

[11] Patent Number: 4,778,780

[45] Date of Patent: Oct. 18, 1988

[54] SYNTHESIS OF CRYSTALLINE SAPO-17

[75] Inventors: Ernest W. Valyocsik, Yardley, Pa.; Roland von Ballmoos, Hopewell, N.J.

[73] Assignee: Mobil Oil Corporation, New York, N.Y.

[21] Appl. No.: 76,977

[22] Filed: Jul. 23, 1987

[51] Int. Cl.$^4$ .................. B01J 27/18; B01J 27/182
[52] U.S. Cl. .................. 502/214; 502/164; 502/208; 423/305; 423/306; 423/327
[58] Field of Search ............ 423/305, 306, 327, 328; 502/214, 164, 208

[56] References Cited

U.S. PATENT DOCUMENTS

| | | | |
|---|---|---|---|
| 4,100,262 | 7/1978 | Pelrine | 423/329 |
| 4,139,600 | 2/1979 | Rollmann et al. | 423/329 |
| 4,151,189 | 4/1979 | Rubin et al. | 260/448 |
| 4,296,083 | 10/1981 | Rollmann | 423/329 |
| 4,341,748 | 7/1982 | Plank et al. | 423/328 |
| 4,440,871 | 4/1984 | Lok et al. | 502/214 |
| 4,482,531 | 11/1984 | Kuehl | 423/329 |
| 4,490,342 | 12/1984 | Valyocsik | 423/328 |
| 4,531,012 | 7/1985 | Valyocsik | 564/295 |
| 4,537,754 | 8/1985 | Casci et al. | 423/277 |
| 4,539,193 | 9/1985 | Valyocsik | 423/328 |
| 4,559,213 | 12/1985 | Kuehl | 423/329 |
| 4,568,654 | 2/1986 | Valyocsik | 502/62 |
| 4,584,286 | 4/1986 | Valyocsik | 502/62 |
| 4,585,638 | 4/1986 | Kuehl | 423/328 |
| 4,585,639 | 4/1986 | Szostak | 423/328 |
| 4,585,746 | 4/1986 | Valyocsik | 502/62 |
| 4,585,747 | 4/1986 | Valyocsik | 502/62 |
| 4,592,902 | 6/1986 | Valyocsik | 423/328 |
| 4,605,637 | 8/1986 | Chang et al. | 502/214 |
| 4,619,820 | 10/1986 | Valyocsik | 423/328 |
| 4,623,527 | 11/1986 | Derouane et al. | 423/306 |
| 4,632,815 | 12/1986 | Valyocsik | 423/328 |
| 4,637,923 | 1/1987 | Szostak | 423/328 |
| 4,640,829 | 2/1987 | Rubin | 423/328 |
| 4,664,897 | 5/1987 | Derovane et al. | 423/306 |
| 4,666,874 | 5/1987 | Dessau | 502/66 |
| 4,666,875 | 5/1987 | Pellet et al. | 502/214 |
| 4,673,559 | 6/1987 | Derouane et al. | 502/214 |
| 4,686,092 | 8/1987 | Lok et al. | 423/306 |

FOREIGN PATENT DOCUMENTS

| | | | |
|---|---|---|---|
| 0042226 | 8/1984 | European Pat. Off. | 33/28 |
| 0051218 | 4/1985 | European Pat. Off. | 33/28 |

OTHER PUBLICATIONS

B. M. Lok, the Role of Organic Molecules in Molecular Sieve Synthesis, 1983, Zeolites, vol. 3, Oct.

*Primary Examiner*—Anthony McFarlane
*Attorney, Agent, or Firm*—Alexander J. McKillop; Michael G. Gilman; Dennis P. Santini

[57] ABSTRACT

This invention relates to a new form of crystalline silicoaluminophosphate identified as SAPO-17, to a new and useful improvement in synthesizing said crystalline material and to use of said crystalline material prepared in accordance herewith as a catalyst for organic compound, e.g. hydrocarbon compound, conversion.

18 Claims, No Drawings

SYNTHESIS OF CRYSTALLINE SAPO-17

BACKGROUND OF THE INVENTION

1. Field of the Invention

This invention relates to a new and useful improvement in synthesizing crystalline SAPO-17, the new SAPO-17 synthesized, and to use of the crystalline material synthesized in accordance herewith as a catalyst component for organic compound, e.g. hydrocarbon compound, conversion.

More particularly, this invention relates to an improved method of preparing crystalline SAPO-17 whereby synthesis is facilitated and reproducible and the product exhibits high purity and catalytic utility.

2. Discussion of the Prior Art

SAPO-17 and its conventional preparation are taught by U.S. Pat. No. 4,440,871, the entire disclosure of which is incorporated herein by reference. The two templates taught to direct synthesis of SAPO-17 are quinuclidine and cyclohexylamine, both leading to "impure" product.

Lok et al (Zeolites, 1983, Vol. 3, October, 282–291) teach numerous organic compounds which act as directing agents for synthesis of various crystalline materials, such as, for example, ZSM-5, ZSM-11, ZSM-12, ZSM-20, ZSM-35, ZSM-48, AlPO$_4$-5, AlPO$_4$-8, AlPO$_4$-20 and others. The article does not show the diquaternary ammonium direction of SAPO-17 synthesis.

Other publications teaching various organic directing agents for synthesis of various crystalline materials include, for example, U.S. Pat. No. 4,592,902, teaching use of an alkyltropinium directing agent, alkyl being of 2 to 5 carbon atoms, for synthesis of ZSM-5; U.S. Pat. No. 4,640,829, teaching use of dibenzyldimethylammonium directing agent for synthesis of ZSM-50; U.S. Pat. No. 4,637,923, teaching use of $(CH_3)_2(C_2H_5)N^+(CH_2)_4N^+(C_2H_5)(CH_3)_2$ directing agent for synthesis of a novel zeolite; U.S. Pat. No. 4,585,747, teaching use of bis(N-methylpyridyl)ethylinium directing agent for synthesis of ZSM-48; U.S. Pat. No. 4,585,746, teaching use of bis(N-methylpyridyl)ethylinium directing agent for synthsis of ZSM-12; U.S. Pat. No. 4,584,286, teaching use of bis(N-methylpyridyl)ethylinium directing agent for synthesis of ZSM-35; U.S. Pat. No. 4,568,654, teaching use of cobalticinium, dimethylpiperidinium, trimethylene bis trimethylammonium or tetramethylpiperazinium directing agents for synthesis of ZSM-51; U.S. Pat. No. 4,559,213, teaching use of DABCO-C$_{4-10}$-diquat directing agent for synthesis of ZSM-12; U.S. Pat. No. 4,482,531, teaching synthesis of ZSM-12 with a DABCO-C$_n$-diquat, n being 4, 5, 6 or 10, directing agent; and U.S. Pat. No. 4,539,193, teaching use of bis(dimethylpiperidinium)trimethylene directing agent for synthesis of ZSM-12.

U.S. Pat. No. 4,139,600 teaches a method for synthesis of zeolite ZSM-5 from a reaction mixture comprising, as a directing agent, an alkyldiamine. U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,341,748 shows synthesis of ZSM-5 structure from reaction mixtures comprising ethanol, ZSM-5 seeds, ethanol and seeds, ethanol and ammonimum hydroxide, and ethanol, ammonimum hydroxide and ZSM-5 seeds. U.S. Pat. No. 4,100,262 teaches synthesis of ZSM-5 from a reaction mixture comprising a tetraalkylammonium source and a tetraureacobalt (II) complex.

Various diquaternary ammonium compounds have been identified as directing agents for a various assortment of crystalline materials. For instance, U.S. Pat. Nos. 4,490,342 and 4,619,820 show synthesis of ZSM-23 from a reaction mixture containing the organic of U.S. Pat. No. 4,531,012, i.e. $(CH_3)_3N^+(R)N^+(CH_3)_3$, where R is a saturated or unsaturated hydrocarbon having 7 carbon atoms. U.S. Pat. No. 4,623,527 teaches numerous diquaternary ammonium compounds and shows use of $(CH_3)_3N^+(CH_2)_7N^+(CH_3)_3$ directing agent for synthesis of MCM-10.

U.S. Pat. No. 4,632,815 teaches numerous diquaternary ammonium compounds and shows use of $(CH_3)_3N^+(CH_2)_4N^+(CH_3)_3$ to direct synthesis of a Silica-X structure type. U.S. Pat. No. 4,585,639 teaches use of the diquaternary $(C_2H_5)(CH_3)_2N^+(CH_2)_{4or6}N^+(CH_3)_2(C_2H_5)$ as directing agent for synthesis of ZSM-12. Synthesis of ZSM-5 is directed by the diquaternary $(alkyl)_3N^+(CH_2)_6N^+(alkyl)_3$, alkyl being propyl or butyl, in U.S. Pat. No. 4,585,638.

EPA No. 42,226 and U.S. Pat. No. 4,537,754 teach existence of numerous diquaternary ammonium compounds, but show use of $(CH_3)_3N^+(CH_2)_6N^+(CH_3)_3$ as directing agent for synthesis of EU-1. EPA No. 51,318 teaches use of the same diquaternary for synthesis of TPZ-3. It is noted that EU-1, TPZ-3 and ZSM-50 have the same structure.

Applicants know of no prior art for preparing crystalline SAPO-17 utilizing as a directing agent a hexamethylhexamethylene diamonium compound as required of the present invention.

SUMMARY OF THE INVENTION

An improved, economical and reproducible method for preparing crystalline silicophosphoaluminate identified as SAPO-17 exhibiting high purity, catalytic activity and other valuable properties is provided. The method comprises forming a reaction mixture hydrogel containing sources of silicon oxide, aluminum oxide, phosphorus oxide, directing agent, and water and having a composition, in terms of mole ratios, within the following ranges:

|  | $\dfrac{P_2O_5}{Al_2O_3}$ | $\dfrac{H_2O}{Al_2O_3}$ | $\dfrac{H^+}{Al_2O_3}$ | $\dfrac{R}{Al_2O_3}$ | $\dfrac{SiO_2}{Al_2O_3}$ |
|---|---|---|---|---|---|
| Most Preferred | 0.5–1.5 | 10–70 | 1–10 | 0.2–5 | 0.05–5 |
| Preferred | 0.2–5.0 | 5–100 | 0.5–20 | 0.1–10 | 0.02–20 |
| Broad | 0.01–20.0 | 2–200 | 0.01–30 | 0.02–20 | 0.01–50 | where R is the directing agent, hereafter more particularly described, and maintaining the mixture until crystals of the desired crystalline material are formed.

Reaction conditions required consist of heating the foregoing reaction mixture to a temperature of from about 80° C. to about 300° C. for a period of time of from about 5 hours to about 20 days. A more preferred temperature range is from about 100° C. to about 200° C. with the amount of time at a temperature in such range being from about 24 hours to about 10 days.

The reaction of the gel particles is carried out until crystals form. The solid product comprising SAPO-17 is recovered from the reaction medium, as by cooling the whole to room temperature, filtering and water washing.

EMBODIMENTS

SAPO-17 synthesized in accordance with the present method exhibits excellent catalytic activity for certain conversions of interest, including cracking, hydrocracking, disproportionation, alkylation, isomerization and oxidation. Further, the directing agent for use in the present method allows synthesis of more pure SAPO-17 than obtained by the prior methods using quinuclidine or cyclohexylamine directing agent.

The particular effectiveness of the presently required directing agent, hereafter more particularly described, when compared with other directing agents, such as those identified above, is believed due to its ability to function as a template in the nucleation and growth of SAPO-17 crystals. This is true even though no predigestion of the gel is required prior to crystallization. This different organic directing agent functions in this fashion in a reaction mixture having the above described composition.

The synthesis of the present invention is facilitated when the reaction mixture comprises seed crystals, such as those having the structure of SAPO-17. The use of at least 0.01%, preferably about 0.10%, and even more preferably about 1% seed crystals (based on total weight) of crystalline material such as SAPO-17 in the reaction mixture will facilitate crystallization in the present method.

The reaction mixture composition for the synthesis of synthetic crystalline SAPO-17 hereby can be prepared utilizing materials which can supply the appropriate oxide. The useful sources of aluminum oxide include, as non-limiting examples, any known form of aluminum oxide or hydroxide, organic or inorganic salt or compound, e.g. alumina and aluminates. The useful sources of phosphorus oxide include, as non-limiting examples, any known form of phosphorus acids or phosphorus oxides, phosphates and phosphites, and organic derivatives of phosphorus. The useful sources of silicon oxide include, as non-limiting examples, any known form of silicic acid or silicon dioxide, alkoxy- or other compounds of silicon, including silica gel and silica hydrosol.

It will be understood that each oxide component utilized in the reaction mixture for preparing SAPO-17 can be supplied by one or more essential reactants and they can be mixed together in any order. For example, any oxide can be supplied by an aqueous solution. The reaction mixture can be prepared either batchwise or continuously. Crystal size and crystallization time for the product composition comprising SAPO-17 will vary with the exact nature of the reaction mixture employed.

The organic diquaternary ammonium directing agent required of the present method is provided by an N,N,N,N',N',N'-hexamethylhexamethylene compound, such as, for example, the hydroxide or halide (e.g. chloride, bromide or iodide). This compound may be structurally represented as follows:

$$X(CH_3)_3N(CH_2)_6N(CH_3)_3X$$

where X is an anion, e.g. hydroxide. The cation of this compound may be represented by the formula:

$$(CH_3)_3N^+(CH_2)_6N^+(CH_3)_3.$$

The SAPO-17 composition as prepared hereby has a characteristic X-ray diffraction pattern in the calcined form, the values of which are set forth in Table 1, hereinafter. The SAPO-17 composition as synthesized hereby can also be identified, in terms of mole ratios of oxides as follows:

$$vA:M_{x/m}^{m+}:(AlO_2)_{1-y}^-:(PO_2)_{1-x}^+:(SiO_2)_{x+y}:N_{y/n}^{n-}:w(H_2O)$$

wherein v is the number of moles of A, occluded organic material resulting from organic directing agent and/or solvent used in synthesis of and filling microporous voids of the SAPO-17, which material may be removed upon calcination, w is moles of $H_2O$, e.g. from 0 to about 5, M represents cations of valence m, N represents anions of valence n, and x and y are numbers which satisfy the following:

$$0.01 < x < 1$$

$$0.01 < y < 1$$

$$x + y < 1$$

The X-ray diffraction pattern of the as-synthesized crystalline material of this invention has characteristic lines shown in Table 1.

TABLE 1

| Interplanar d-Spacing (A) | Relative Intensity ($I/I_O$) |
|---|---|
| 11.45 ± 0.20 | m-vs |
| 9.14 ± 0.15 | w-m |
| 7.61 ± 0.15 | w |
| 6.59 ± 0.15 | m-vs |
| 6.32 ± 0.15 | m |
| 5.70 ± 0.10 | w-m |
| 5.34 ± 0.10 | w |
| 4.62 ± 0.10 | w |
| 4.55 ± 0.10 | w |
| 4.36 ± 0.05 | m-s |
| 4.30 ± 0.05 | m-s |
| 4.01 ± 0.05 | w-m |
| 3.86 ± 0.05 | w-m |
| 3.79 ± 0.05 | m-s |
| 3.74 ± 0.05 | m-s |
| 3.60 ± 0.05 | m-s |
| 3.28 ± 0.05 | m-s |
| 3.15 ± 0.05 | w |
| 2.91 ± 0.03 | w |
| 2.88 ± 0.03 | w |
| 2.84 ± 0.03 | w-m |
| 2.79 ± 0.03 | w |
| 2.66 ± 0.03 | w |

These X-ray diffraction data were collected with a Rigaku diffraction system, equipped with a graphite diffracted beam monochromator and scintillation counter, using copper K-alpha radiation. The diffraction data were recorded by step-scanning at 0.02 degrees of two-theta, where theta is the Bragg angle, and a counting time of 1 second for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (75-100), s=strong (50-74), m=medium (25-49) and w=weak (0-24). It should be understood that diffraction data listed for this sample as single lines may consist of multiple overlapping lines which under certain conditions, such as differences in crystallite sizes or very high experimental resolution or crystallographic changes, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, amd thermal and/or hydrothermal history.

While the improved crystalline material of the present invention may be used in a wide variety of organic compound, e.g. hydrocarbon compound, conversion reactions, it is notably useful in the processes of cracking, hydrocracking, isomerization and reforming. Other conversion processes for which improved SAPO-17 may be utilized in one or more of its active forms include, for example, dewaxing.

Synthesis SAPO-17 prepared in accordance herewith can be used either in the as-synthesized form, the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to SAPO-17 such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

Synthetic SAPO-17, when employed either as an adsorbent or as a catalyst in a hydrocarbon conversion process, should be dehydrated at least partially. This can be done by heating to a temperature in the range of from about 65° C. to about 315° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized SAPO-17 can be prepared by heating same at a temperature of from about 200° C. to about 550° C. for from 1 hour to about 48 hours.

As above mentioned, synthesis SAPO-17 prepared in accordance herewith can have original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earths and metals from Groups IIA, IIIA, IVA, IB, IIB, IIIB, IVB, VIB AND VIII of the Periodic Table of Elements, especially Mn, Ca, Mg, Zn, Cd, Pd, Ni, Cu, Ti, Al, Sn, Fe and Co.

Typical ion exchange technique would be to contact the synthetic SAPO-17 with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the SAPO-17 is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

The crystalline SAPO-17 prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline silicate can be extruded before drying or dried or partially dried and then extruded.

In the case of many catalysts, it is desired to incorporate the SAPO-17 hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina. The latter may be either naturally occurring or in the form of gelatinous precipitates, sols or gels including mixtures of silica and metal oxides. Use of a material in conjuction with the SAPO-17, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized SAPO-17 include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the SAPO-17 crystals hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline silicate content ranging from about 1 to about 90 percent by weight, and more usually in the range of about 2 to about 50 percent by weight of the composite.

Employing a catalytically active form of the composition of this invention containing a hydrogenation component, reforming stocks can be reformed employing a temperature between 450° C. and 550° C. The pressure can be between 50 and 500 psig, but is preferably between 100 and 300 psig. The liquid hourly space velocity is generally between 0.1 and 10 $hr^{-1}$, preferably between 1 and 4 $hr^{-1}$ and the hydrogen to hydrocarbon mole ratio is generally between 1 and 10, preferably between 3 and 5.

The catalyst can also be used for hydroisomerization of normal paraffins, when provided with a hydrogenation component, e.g. platinum. Hydroisomerization is carried out at a temperature between 250° C. to 450° C., preferably 300° C. to 425° C., with a liquid hourly space velocity between 0.1 and 10 $hr^{-1}$, preferably between 0.5 and 4 $hr^{-1}$, employing hydrogen such that the hydrogen to hydrocarbon mole ratio is between 1 and 10. Additionally, the cata;lyst can be used for olefin or aromatics isomerization employing temperatures between 0° C. and 550° C.

The catalyst can also be used for reducing the pour point of gas oils. This process is carried out at a liquid hourly space velocity between about 0.1 and about 5 $hr^{-1}$ and a temperature between about 300° C. and about 425° C.

Other reactions which can be accomplished employing the catalyst of this invention containing a metal, e.g. platinum, include hydrogenation-dehydrogenation reactions and desulfurization reactions, olefin polymerization (oligomerization), and other organic compound conversions such as the conversion of alcohols (e.g. methanol) to hydrocarbons.

In order to more fully illustrate the nature of the invention and the manner of practicing same, the following examples are presented. In the examples, whenever adsorption data are set forth for comparison of sorptive capacities for water, cyclohexane and n-hexane, they were determined as follows:

A weighed sample of the calcined adsorbent was contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure was kept constant (within about 0.5 mm) by addition of absorbate vapor controlled by a manostat during the adsorption period, which did not exceed about 8 hours. As adsorbate was adsorbed by the sorbant material, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 $sec^{-1}$). In the case of zeolite HZSM-5, for example, only 174 ppm of tetrahedrally coordinated $Al_2O_3$ are required to provide an Alpha Value of 1. The Alpha Test is described in U.S. Pat. No. 3,354,078 and in *The Journal of Catalysis*, Vol. IV, pp. 522-529 (August 1965), each incorporated herein by reference as to that description. The catalyst tested in this Alpha Test must be in the hydrogen or hydronium form. This may be accomplished by hydrolysis of the material followed by calcination, by contact of the material with an ammonium salt or acid solution followed by calcination, or by calcination of the material if it contains a hydrogen precursor by way of its synthesis.

EXAMPLE 1

A 23.1 g quantity of 86.3% $H_3PO_4$ was diluted with 100.6 g $H_2O$, followed by the mixing of 10.3 g Kaiser alumina into the dilute phosphoric acid solution. This slurry was digested, with stirring, at 90° C. for 1 hour.

To the digested slurry suspension was added 29.0 g of 3.51N $HO(CH_3)_3N(CH_2)_6N(CH_3)_3OH$, i.e., $N,N,N,N^1,N^1,N^1$-hexamethylhexamethylene hydroxide, as directing agent source of $(CH_3)_3N^+(CH_2)_6N^+(CH_3)_3$.

The suspension was then transferred to a 300 ml stainless steel autoclave. A 21.2 g quantity of tetraethylorthosilicate was then poured into the autoclave before sealing. The sealed autoclave was heated to 180° C. and stirred (800 rpm) at this temperature and autogenous pressure for 4 days.

The crystalline product was separated from the final liquids by filtration, water washed, and then dried at 110° C. The dried product crystals were analyzed by X-ray diffraction, proving it to be essentially pure SAPO-17. Table 2 lists the X-ray diffraction pattern of the dried, as-synthesized, product of this example.

TABLE 2

| Interplanar d-Spacings (A) | Observed 2 × Theta | Relative Intensities ($I/I_o$) |
|---|---|---|
| 11.51657 | 7.676 | 59 |
| 9.14244 | 9.674 | 27 |
| 6.63441 | 13.346 | 38 |
| 6.29684 | 14.065 | 19 |
| 5.74071 | 15.435 | 56 |
| 5.36297 | 16.530 | 26 |
| 4.96732 | 17.857 | 13 |
| 4.56047 | 19.464 | 36 |
| 4.33492 | 20.488 | 100 |
| 4.12879 | 21.523 | * |
| 4.09114 | 21.723 | * |
| 3.99482 | 22.253 | 21 |
| 3.81968 | 23.288 | 37 |
| 3.75322 | 23.706 | 42 |
| 3.57345 | 24.917 | 39 |

TABLE 2-continued

| Interplanar d-Spacings (A) | Observed 2 × Theta | Relative Intensities (I/I$_o$) |
|---|---|---|
| 3.56033 | 25.011 | * |
| 3.30684 | 26.963 | 22 |
| 3.27402 | 27.238 | 15 |
| 2.92457 | 30.568 | 9 |
| 2.88454 | 31.002 | 12 |
| 2.86293 | 31.242 | 18 |
| 2.83477 | 31.561 | 24 |
| 2.81433 | 31.796 | 28 |
| 2.67528 | 33.496 | 14 |

*Indicates contribution from another phase.

A quantity of the as-synthesized SAPO-17 of this example was calcined at 500° C. in air for 3 hours and also analyzed by X-ray diffraction. The results of this analysis, listed in Table 3, prove the product SAPO-17 hereof to be structurally stable to thermal treatment.

TABLE 3

| Interplanar d-Spacings (A) | Observed 2 × Theta | Relative Intensities (I/I$_o$) |
|---|---|---|
| 11.44793 | 7.723 | 63 |
| 9.14390 | 9.673 | 24 |
| 7.60746 | 11.632 | 7 |
| 6.58549 | 13.445 | 100 |
| 6.32513 | 14.001 | 44 |
| 5.70049 | 15.545 | 18 |
| 5.34000 | 16.590 | 10 |
| 4.61649 | 19.226 | 14 |
| 4.55152 | 19.503 | 16 |
| 4.35522 | 20.391 | 54 |
| 4.30163 | 20.648 | 61 |
| 4.13107 | 21.511 | * |
| 4.09580 | 21.698 | * |
| 4.00608 | 22.190 | 27 |
| 3.86459 | 23.013 | 16 |
| 3.83042 | 23.222 | 17 |
| 3.78583 | 23.499 | 43 |
| 3.73926 | 23.796 | 42 |
| 3.59762 | 24.747 | 43 |
| 3.27735 | 27.210 | 39 |
| 3.15331 | 28.302 | 16 |
| 2.90562 | 30.772 | 9 |
| 2.88320 | 31.017 | 10 |
| 2.83865 | 31.517 | 32 |
| 2.79119 | 32.067 | 9 |
| 2.65976 | 33.697 | 8 |

*Indicates contribution from another phase.

A quantity of the calinced SAPO-17 of this example was analyzed for chemical composition, the results being as follows:

| Component | Wt. % |
|---|---|
| C | 7.73 |
| N | 1.43 |
| Na | 0.016 |
| Al | 13.96 |
| P | 14.99 |
| Si | 11.15 |
| Ash | 92.76 |

EXAMPLE 2

A quantity of the calcined SAPO-17 of Example 1 was ammonium-exchanged by refluxing for 6 hours in 1M NH$_4$NO$_3$. The H$^+$-form of this material was then tested for Alpha Value, found to be 8, and Sorption Capacity, found to be as follows:

| Component Sorbed | Wt. % Sorbed |
|---|---|
| n-Hexane | 3.8 |
| Cyclohexane | 0.7 |
| Water | 11.1 |

What is claimed is:

1. A method for synthesizing a crystalline silicoaluminophosphate exhibiting a characteristic X-ray diffraction pattern as shown in Table 1 of the specification, which comprises (i) preparing a mixture capable of forming said silicoaluminophosphate, said mixture comprising sources of an oxide of silicon, an oxide of aluminum, an oxide of phosphorus, water and a directing agent (R), and having a composition, in terms of mole ratios, within the following ranges:

| $\frac{P_2O_5}{Al_2O_3}$ | $\frac{H_2O}{Al_2O_3}$ | $\frac{H^+}{Al_2O_3}$ | $\frac{R}{Al_2O_3}$ | $\frac{SiO_2}{Al_2O_3}$ |
|---|---|---|---|---|
| 0.01–20 | 2–200 | 0.01–30 | 0.02–20 | 0.01–50 | wherein R is a diquaternary ammonium cation of the formula

(CH$_3$)$_3$N$^+$(CH$_2$)$_6$N$^+$(CH$_3$)$_3$, (ii) maintaining said mixture under sufficient conditions until crystals of said silicoaluminophosphate are formed and (iii) recovering said crystalline silicoaluminophosphate from step (ii), said recovered crystalline silicoaluminophosphate containing said R.

2. The method of claim 1 wherein said mixture has the following composition ranges:

| $\frac{P_2O_5}{Al_2O_3}$ | $\frac{H_2O}{Al_2O_3}$ | $\frac{H^+}{Al_2O_3}$ | $\frac{R}{Al_2O_3}$ | $\frac{SiO_2}{Al_2O_3}$ |
|---|---|---|---|---|
| 0.2–5 | 5–100 | 0.5–20 | 0.1–10 | 0.02–20 |

3. The method of claim 1 wherein said source of directing agent R is the hydroxide or halide.

4. The method of claim 2 wherein said source of directing agent R is the hydroxide or halide.

5. The method of claim 1 wherein said mixture further comprises seed crystals in sufficient amount to enhance synthesis of said crystalline silicoaluminophosphate.

6. The method of claim 5 wherein said seed crystals have the structure of silicoaluminophosphate SAPO-17.

7. The method of claim 1 comprising replacing cations of the crystalline silicoaluminophosphate recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

8. The method of claim 2 comprising replacing cations of the crystalline silicoaluminophosphate recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

9. The method of claim 7 wherein said replacing cation is hydrogen or a hydrogen precursor.

10. The method of claim 8 wherein said replacing cation is hydrogen or a hydrogen precursor.

11. The recovered crystalline silicoaluminophosphate of claim 1.

12. The recovered crystalline silicoaluminophosphate of claim 2.

13. The diquaternary ammonium R-containing product crystalline silicophosphoaluminate of claim 7.

14. The diquaternary ammonium R-containing product crystalline silicophosphoaluminate of claim 8.

15. The diquaternary ammonium R-containing product crystalline silicophosphoaluminate of claim 9.

16. The diquaternary ammonium R-containing product crystalline silicophosphoaluminate of claim 10.

17. A mixture capable of forming crystals of silicoaluminophosphate SAPO-17 structure upon crystallization, said mixture comprising sources of an oxide of silicon, an oxide of aluminum, an oxide of phosphorus, water and diquaternary ammonium cation (A) of the formula:

$$(CH_3)_3N^+(CH_2)_6N^+(CH_3)_3$$

and having a composition, in terms of mole ratios, within the following ranges:

| $\dfrac{P_2O_5}{Al_2O_3}$ | $\dfrac{H_2O}{Al_2O_3}$ | $\dfrac{H^+}{Al_2O_3}$ | $\dfrac{R}{Al_2O_3}$ | $\dfrac{SiO_2}{Al_2O_3}$ |
|---|---|---|---|---|
| 0.01–20 | 2–200 | 0.01–30 | 0.02–20 | 0.01–50. |

18. The mixture of claim 17 further comprising seed crystals in sufficient amount to enhance synthesis of said silicoaluminophosphate SAPO-17.

* * * * *